(No Model.)

J. STORY.
DEVICE FOR PROTECTING THE EYES.

No. 251,743. Patented Jan. 3, 1882.

Witnesses.
H. W. Mortimer
A. C. Kiskadden

Inventor
Jno. Story
per
F. A. Lehmann,
Atty.

United States Patent Office.

JOHN STORY, OF CASTLE SHANNON, PENNSYLVANIA.

DEVICE FOR PROTECTING THE EYES.

SPECIFICATION forming part of Letters Patent No. 251,743, dated January 3, 1882.

Application filed May 17, 1881. (No model.)

*To all whom it may concern:*

Be it known that I, JOHN STORY, a citizen of the United States, residing at Castle Shannon, in the county of Allegheny and State of Pennsylvania, have invented certain new and useful Improvements in Devices for Protecting the Eyes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to devices for protecting the eyes against the effects of the direct rays of artificial light; and it consists in the combination, with a lamp, of a prism and means for adjusting it.

The effect upon the eye from a strong light is temporary blindness that becomes perceptible when the eye is turned away from the light and directed toward objects in the shade. This is owing to the contraction of the pupil in the effort of the eye to protect itself against a painful sensation, caused by the volume of light thrown upon the retina. The consequence is that persons walking at night in the streets, after looking at the bright lights of the lamps, are blinded and frequently made to stumble before they are able to see anything before them, the pupil of the eye not yet having had time to expand sufficiently for an entrance of a greater volume of rays of diminished light necessary to distinguish objects.

The devices heretofore used for protecting the eyes from the direct rays of light have been to decrease its volume, and attempts have been made to shield the eyes against the intensity of the electric light by coverings of opal and other shades, but it has always been at the expense of the volume of light by decreasing it from twenty to thirty per cent.

My invention removes the necessity of decreasing the light, and enables the eye, without a painful sensation, to meet and endure it. It also removes a defect in our lamps, since the shadow cast around the foot, extending sometimes from one to three feet in diameter and causing great inconvenience, is completely dispelled and the light under the lamp made as bright as at other places.

I shall now endeavor to describe my invention, of which the accompanying drawings are a representation.

Figure 1:
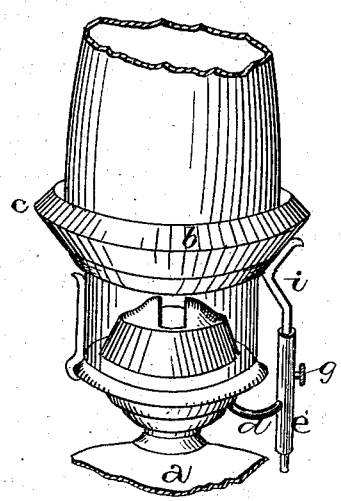
Figure 2:
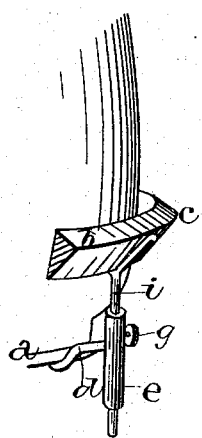
Figure 3:
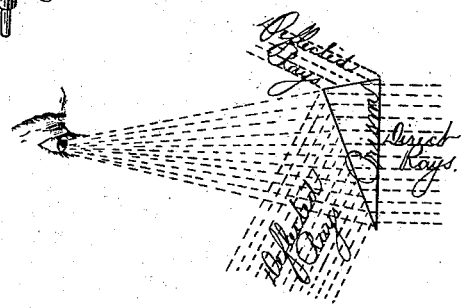

Figure 1 is a perspective of my invention. Fig. 2 is a sectional detail view. Fig. 3 illustrates the effect of the light.

The light of a lamp, $a$, be it obtained from gas or electricity, is surrounded by an annular prism, $b$, one side of which deflects the rays of light that enter the prism on a line below the outer angle, $c$, downward, so as to surround the foot of the lamp, dispel its shadow, and make the lamp practically shadowless. The light passing through the prism is not thereby diminished, but its rays are divided more or less in proportion with the acuteness of the outer angle, $c$, of the prism and deflected from the direct line. Hence the eye looking at the light will not encounter any of those rays that cause the blinding glare so painful to the eye.

In order to make this prism adjustable upon the outer side of the chimney, and thus adapt it to different heights, a rod or wire, $d$, is secured to the burner or other support, and to the outer end of this arm is secured a sleeve, $e$, which is provided with a set-screw, $g$.

Secured or attached to the prism in any suitable manner is the vertical support $i$, which has its lower end to pass down through the sleeve, and which support can be adjusted up and down in the sleeve and secured at any desired point by means of the set-screw. By this means the prism can be raised up above the flame, so as to allow the rays of light to pass unobstructedly outward, or to adjust it to the elevation desired.

Having thus described my invention, I claim—

1. The combination, with a lamp or other light, of a prism and mechanism for adjusting the prism vertically, substantially as shown.

2. The combination of the lamp, the arm $d$, sleeve $e$, the screw $g$, support $i$, and prism $b$, substantially as described.

JOHN STORY.

Witnesses:
LOUIS MOESER,
T. F. LEHMANN.